United States Patent
Paul et al.

(10) Patent No.: US 9,760,424 B2
(45) Date of Patent: Sep. 12, 2017

(54) SYSTEMS AND METHODS FOR DYNAMICALLY REPORTING A BOOT PROCESS IN CONTENT/SERVICE RECEIVERS

(75) Inventors: Thanabalan Thavittupitchai Paul, Carmel, IN (US); John Alan Gervais, Carmel, IN (US); Xiaowei Xu, Carmel, IN (US)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 1027 days.

(21) Appl. No.: 12/012,064

(22) Filed: Jan. 31, 2008

(65) Prior Publication Data

US 2009/0198793 A1 Aug. 6, 2009

(51) Int. Cl.

| | |
|---|---|
| *G06F 11/07* | (2006.01) |
| *H04N 21/442* | (2011.01) |
| *G06F 11/30* | (2006.01) |
| *G06F 9/44* | (2006.01) |
| *H04N 21/4425* | (2011.01) |
| *H04N 21/443* | (2011.01) |
| *H04L 12/24* | (2006.01) |
| *H04L 12/26* | (2006.01) |
| *H04N 21/488* | (2011.01) |
| *H04N 21/658* | (2011.01) |

(52) U.S. Cl.
CPC ........ *G06F 11/0772* (2013.01); *G06F 9/4401* (2013.01); *G06F 11/07* (2013.01); *G06F 11/0706* (2013.01); *G06F 11/0787* (2013.01); *G06F 11/3055* (2013.01); *H04N 21/442* (2013.01); *H04N 21/4425* (2013.01); *H04N 21/4432* (2013.01); *H04L 41/06* (2013.01); *H04L 43/00* (2013.01); *H04L 43/0817* (2013.01); *H04N 21/4424* (2013.01); *H04N 21/4882* (2013.01); *H04N 21/6581* (2013.01)

(58) Field of Classification Search
CPC .. G06F 11/07; G06F 11/0706; G06F 11/0772; G06F 11/0787; G06F 11/079; G06F 9/4401; G06F 9/4411; G06F 9/4416
USPC ............ 709/227, 203, 220–224, 218; 713/2; 725/37, 131, 139, 151; 714/23, 27, 36
See application file for complete search history.

(56) References Cited

U.S. PATENT DOCUMENTS

| | | | | |
|---|---|---|---|---|
| 5,794,031 | A | * | 8/1998 | Nakadai .................. G06F 9/442 713/2 |
| 5,951,686 | A | * | 9/1999 | McLaughlin et al. ............ 713/2 |

(Continued)

*Primary Examiner* — Ramy M Osman
(74) *Attorney, Agent, or Firm* — Tutunjian & Bitetto, P.C.

(57) ABSTRACT

The boot process of a content/service receiver is dynamically monitored to provide error and/or status information in a step-by-step and/or in a single-snapshot manner. This can be accomplished by, for example, utilizing an application thread running within, and/or outside the context of the boot code. Status information from, for example, software drivers and/or any other software/hardware/middleware components, is acquired by the application thread utilizing any mechanism, for example, event-driven and/or polling, and then relayed to an external entity, which can be locally and/or remotely located. The external entity can be reached by any means of standard and/or proprietary medium and protocols available, if necessary. The relayed information can then be used, for example, for displaying to a user via a graphical user interface, and/or can be recorded and the like.

25 Claims, 7 Drawing Sheets

(56) References Cited

U.S. PATENT DOCUMENTS

| | | | |
|---|---|---|---|
| 6,463,531 B1* | 10/2002 | Aguilar et al. | 713/2 |
| 6,629,240 B1* | 9/2003 | Lee | 713/2 |
| 6,745,343 B1* | 6/2004 | Barenys et al. | 714/36 |
| 7,003,659 B2* | 2/2006 | Rich et al. | 713/2 |
| 7,266,726 B1* | 9/2007 | Ladd et al. | 714/27 |
| 7,315,962 B2* | 1/2008 | Neuman et al. | 714/36 |
| 7,546,630 B2* | 6/2009 | Tabi | 726/2 |
| 8,060,813 B2* | 11/2011 | Yoon et al. | 714/807 |
| 2003/0070115 A1* | 4/2003 | Nguyen | G06F 11/0787 714/23 |
| 2003/0074549 A1* | 4/2003 | Paul et al. | 713/2 |
| 2003/0233667 A1* | 12/2003 | Umipig et al. | 725/152 |
| 2004/0073637 A1* | 4/2004 | Larson et al. | 709/222 |
| 2004/0267708 A1* | 12/2004 | Rothman et al. | 707/3 |
| 2005/0015601 A1* | 1/2005 | Tabi | 713/182 |
| 2005/0144651 A1* | 6/2005 | Prus et al. | 725/131 |
| 2006/0294512 A1 | 12/2006 | Seiden | |
| 2007/0157011 A1* | 7/2007 | Kumar et al. | 713/1 |
| 2007/0162932 A1* | 7/2007 | Mickle et al. | 725/37 |
| 2008/0028219 A1* | 1/2008 | Booth | 713/171 |
| 2009/0019344 A1* | 1/2009 | Yoon et al. | 714/807 |
| 2009/0172462 A1* | 7/2009 | Rothman et al. | 714/2 |

* cited by examiner

SYSTEMS AND METHODS FOR DYNAMICALLY REPORTING A BOOT PROCESS IN CONTENT/SERVICE RECEIVERS

TECHNICAL FIELD

The subject matter relates generally to telecommunications, and more particularly to systems and methods for dynamically reporting boot processes in content/service receivers.

BACKGROUND

Content distribution systems for televisions and other types of video/audio systems have evolved into complex systems that interact through networks. These types of systems can even use the Internet and telephone systems to distribute content. For example, a television content distribution system can utilize Internet Protocol (IP) for the delivery of television content and services. These systems can be comprised of a gateway server device that interacts with different types of settop box (STB)-client receivers. There can be hundreds of receivers of different types and models that need to be updated and/or maintained on a regular basis. If problems arise during the update or boot process, an end-user typically contacts a service technician over the telephone. Since the service technician is unable to personally witness the boot process, it is often difficult to diagnose. Users generally aren't technically savvy and often do not know which information is important to diagnose problems. They may also give non-technical descriptions that are hard for the technician to fully understand. These issues substantially increase the time it takes to resolve the problem.

SUMMARY

Status information is acquired during a boot process of a content/service receiver and reported. In one instance, this is accomplished utilizing an application thread running within boot code. Status information from, for example, software drivers is acquired by the application thread and then relayed to an external entity. The relayed information can be used, for example, for displaying to a user via a graphical user interface and the like. By extracting the status information dynamically during the boot process, the boot process can be monitored and properly diagnosed if necessary. This is especially helpful when remote technicians are assisting customers, saving time and increasing customer satisfaction during problem calls.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

Content delivery systems are typically comprised of one or more gateway server devices and several different types of client content/service receivers. The content/service receivers go through many phases in an operational software download and boot process. Thus, it is helpful to track and report the boot progress dynamically. The systems and methods disclosed herein allow content/service receivers to dynamically report their boot status and/or error codes to a display for easier troubleshooting between an end-user and a content/service provider's technical support. In one instance, there is a common interface (display) shown to the end-user which keeps reporting up-to-date information during the various download/boot-up phases involved in one single screen so that any problem that occurs, can easily be troubleshot by visual inspection.

Figure 1:
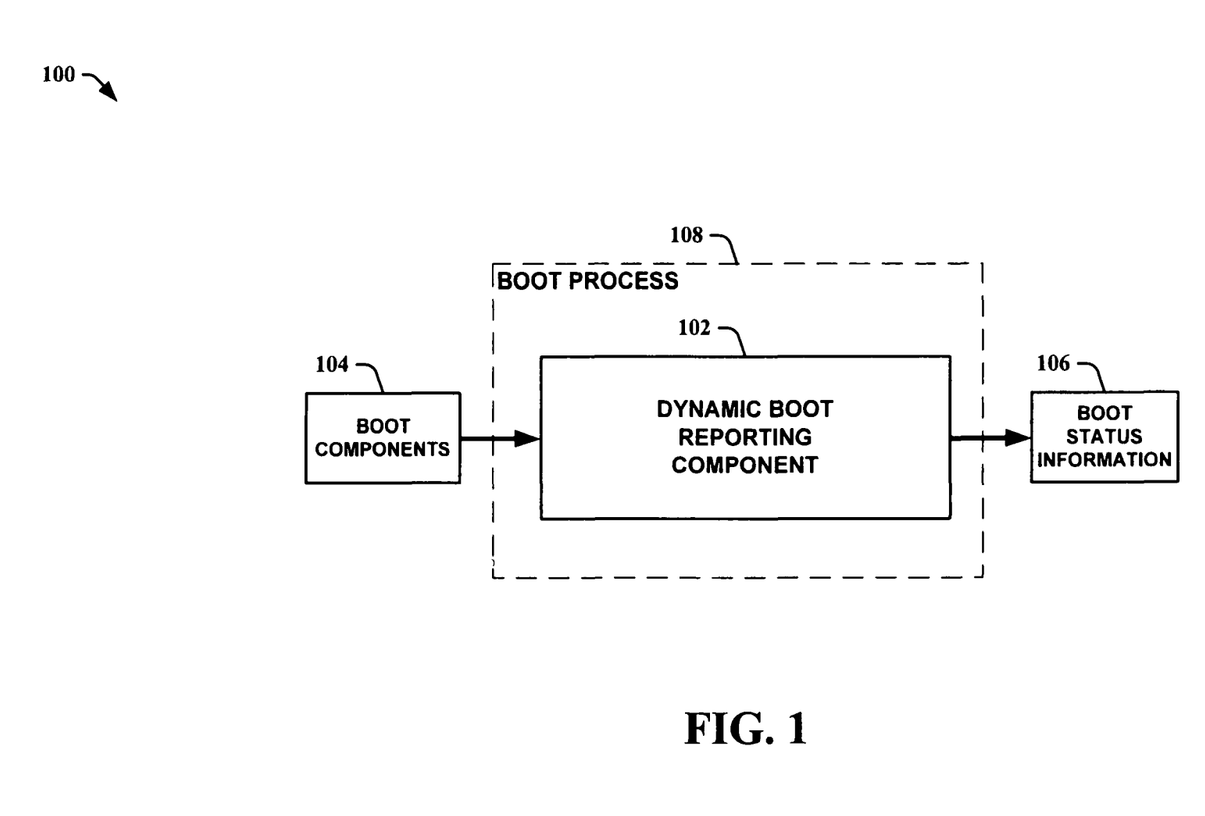
FIG. 1 is a block diagram of a dynamic boot reporting system in accordance with an aspect of an embodiment.

FIG. 1 shows a block diagram of a dynamic boot reporting system 100 that utilizes a dynamic boot reporting component 102 which can operate within a boot process 108 to retrieve information from boot components 104 and relay it as boot status information 106. The boot process 108 is typically associated with a content/service receiver that facilitates in displaying content/services to an end-user. These types of devices, such as set top boxes, allow remote content/service providers to interface with various display devices such as, for example, televisions/monitors and the like. The content/service receivers can be connected to the content/service provider via various types of networks such as, for example, satellite networks, telephone networks (e.g., DSL, etc.), cable networks, and/or cellular networks and the like.

The content/service receivers can be connected via wired means and/or wireless means to one or both of the content/service provider and/or to a local display device (e.g., a device used to display the provided content and/or a device used to facilitate status information and the like). For example, a wireless content/service receiver can utilize cellular communications to receive content/services from a provider and utilize, for example, Bluetooth technology (i.e., short-range wireless, etc.) to transmit the content/services to a local display device. The techniques disclosed herein are also not limited to only IP based content/service receivers and can be applied to non-IP content/service receivers as well.

The dynamic boot reporting component 102 typically operates within the boot process 108 to allow real-time reporting of the status of the boot components 104. The boot components 104 can include, but are not limited to, software drivers associated with various components of a content/service receiver. The drivers are generally required to provide a controllable interface to lower level firmware that controls various hardware. However, the boot components 104 can also include any component of the content/service receiver that interacts and/or powers-up with the boot process 108. For example, the integrity of a lookup table and/or other database/memory location can be checked during the boot process 108. This information can then become part of the boot status information 106 reported by the dynamic boot reporting component 102. Other boot status information 106 can include, for example, connected device (e.g., displays, networks, etc.) statuses such as, for example, power status, and/or connection status, etc. The boot status information 106 is reported as it occurs by the dynamic boot reporting component 102. This can aid in troubleshooting the boot process 108.

Figure 2:
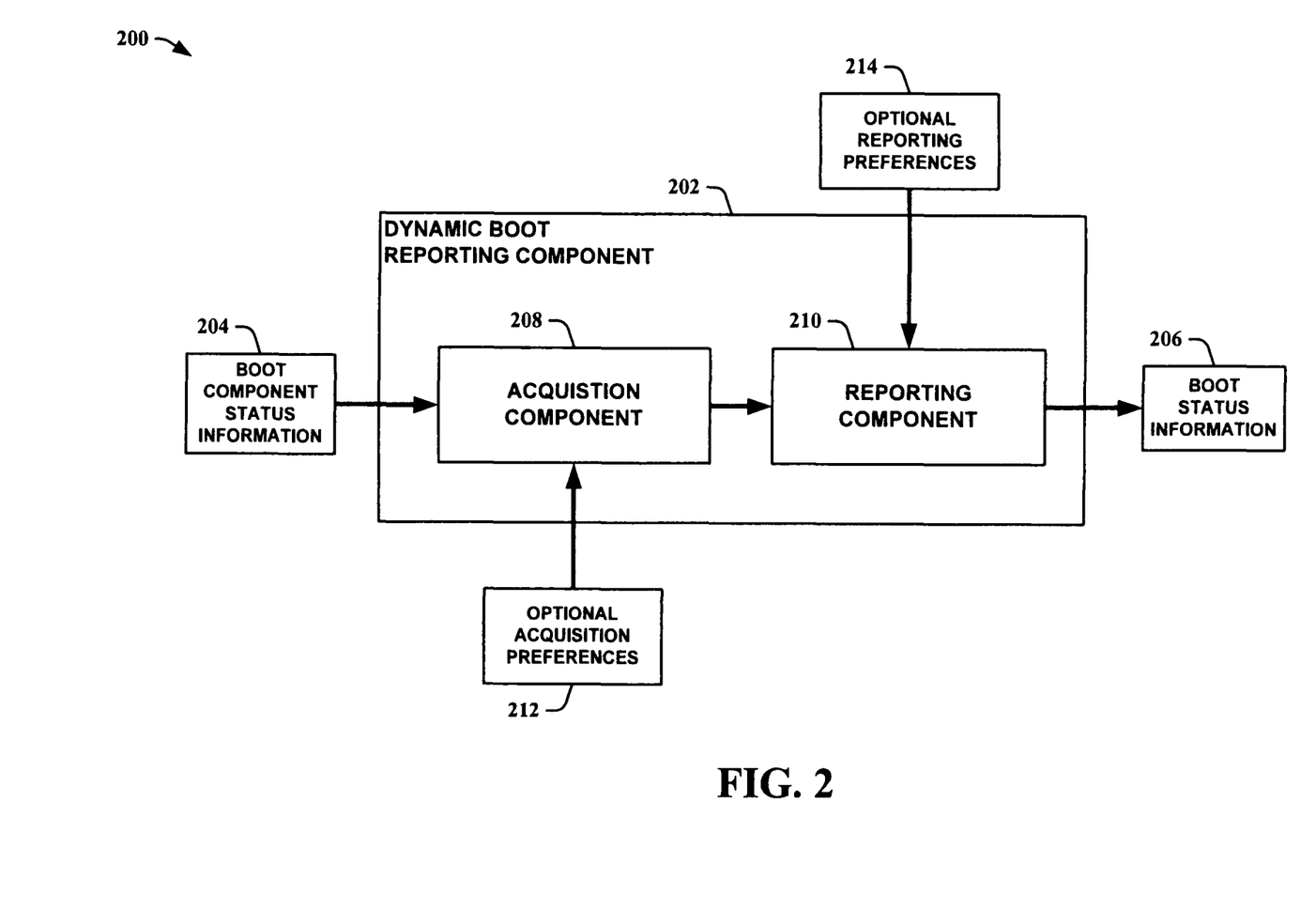
FIG. 2 is another block diagram of a dynamic boot reporting system in accordance with an aspect of an embodiment.

In FIG. 2, a dynamic boot reporting system 200 employs a dynamic boot reporting component 202 to obtain boot component status information 204 and report it as boot status information 206. The dynamic boot reporting component 202 employs an acquisition component 208 and a reporting component 210. The acquisition component 208 receives boot component status information 204. The boot component status information 204 is obtained from various components of a content/service receiver that relay status information during a boot process and can include, but is not limited to, information from software drivers, hardware blocks, middleware, application, memory, and/or data and the like. The acquisition component 208 can accept optional acquisition preferences 212. The optional acquisition preferences 212 can include preferences as to which boot components to receive information from and/or interface/protocol information necessary to interface with various boot components. Thus, the optional acquisition preferences 212 can allow the acquisition component 208 to be updated/changed as necessary to make it compatible with different firmware and/or to modify content delivery parameters, and/or models, etc. of content/service receivers. The optional acquisition preferences 212 can be obtained by the acquisition component 208 via a local interface (e.g., from a connected display device and/or input device) and/or via a remote interface (e.g., over a network) and the like.

The reporting component 210 obtains the boot component status information 204 from the acquisition component 208 and dynamically reports it as boot status information 206. The boot status information 206 can be utilized, for example, to aid a troubleshooting process. The boot status information 206 can appear locally relative to the content/service receiver such as, for example, on a display device connected to the content/service receiver and/or on an integrated content/service receiver display. The boot status information 206 can also appear remotely such as, for example, on a display located near a content provider service technician and the like. Thus, the reporting component 210 can report the boot status information 206 via any communication means to any location. As noted above, the communication means can include wired and/or wireless networks and the like. The reporting component 210 can also include multiple interface protocols to allow the boot status information 206 to be reported to multiple locations. The reporting component 210 can also be integrated with a content/service receiver's video components to report the information via a connected display device using an OSD.

The reporting component 210 can also obtain optional reporting preferences 214. The optional reporting preferences 214 can include preferences, for example, as to what boot status information is to be reported. Thus, the optional reporting preferences 214 can allow the reporting component 210 to be updated/changed as necessary to make it compatible with boot processes, end-users and/or content/service receiver models, etc. The optional reporting preferences 214 can be obtained by the reporting component 210 via a local interface (e.g., from a connected display device and/or input device) and/or via a remote interface (e.g., over a network) and the like. This can greatly enhance a troubleshooting process by eliminating detailed information that is unlikely to assist a technician. This is usually important when the technician is assisting an unknowledgeable end-user over a telephone, etc. because the end-user may not be able to adequately interpret complicated data. On the other hand, the reported information may not be detailed enough to assist the technician. Thus, in one instance, dynamic boot reporting system 200 can receive optional reporting preferences 214 via a remote interface and/or a technician can guide an end-user to submit the reporting preferences 214 via a local interface (e.g., front panel controls, switch and/or button, etc.).

Figure 3:
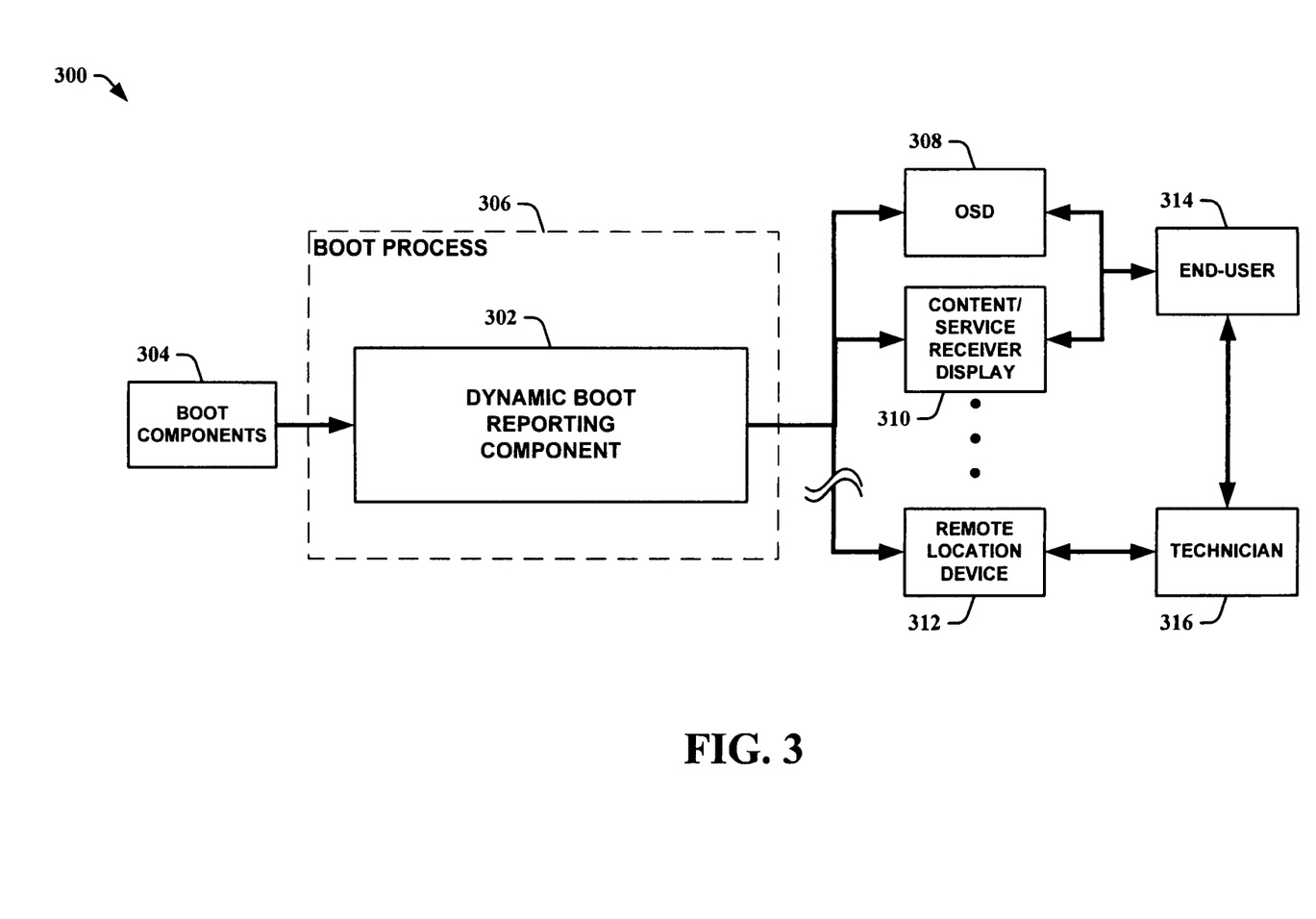
FIG. 3 is an example of a dynamic boot reporting system with various interfaces in accordance with an aspect of an embodiment.

Looking at FIG. 3, an example of a dynamic boot reporting system 300 with various interfaces 308-312 in accordance with an aspect of an embodiment is shown. In this example, the dynamic boot reporting system 300 utilizes a dynamic boot reporting component 302 running in a boot process 306. The boot process 306 is generally associated with a content/service receiver. The dynamic boot reporting component 302 obtains boot status information from various boot components 304 and reports the information as boot status information via various interfaces 308-312. The various interfaces 308-312 are not meant to be a conclusive list of possible interfaces and do not limit the techniques disclosed here in any manner. As an example, the dynamic boot reporting component 302 can interface with a local display device to relay information via an OSD interface 308 to an end-user 314 and the like. The dynamic boot reporting component 302 can also interface with a content/service receiver to relay information via an integrated content/service receiver display 310. Other localized means of relaying information to an end-user 314 are also possible such as, for example, utilizing an audio interface to relay the boot status information to the end-user and/or directly to a technician 314 via a communication means (e.g., cell phone, telephone, etc.).

In a typical trouble shooting process, a remote technician 316 is using the end-user 314 as an information relay component. Thus, the end-user 314 can be partially and/or wholly eliminated from the information relaying by utilizing audio as mentioned and/or by having the dynamic boot reporting component 306 report the boot status information to a remote location device 312. The remote location device 312 can be, for example, a display device and/or an audio device and the like. This allows the technician 316 direct access to the boot status information from the dynamic reporting component 302 and can substantially reduce troubleshooting time by eliminating the end-user 314 from the process. Thus, the flexibility of the dynamic boot reporting system 300 substantially increases its worth in troubleshooting problems associated with a content/service receiver.

Figure 4:
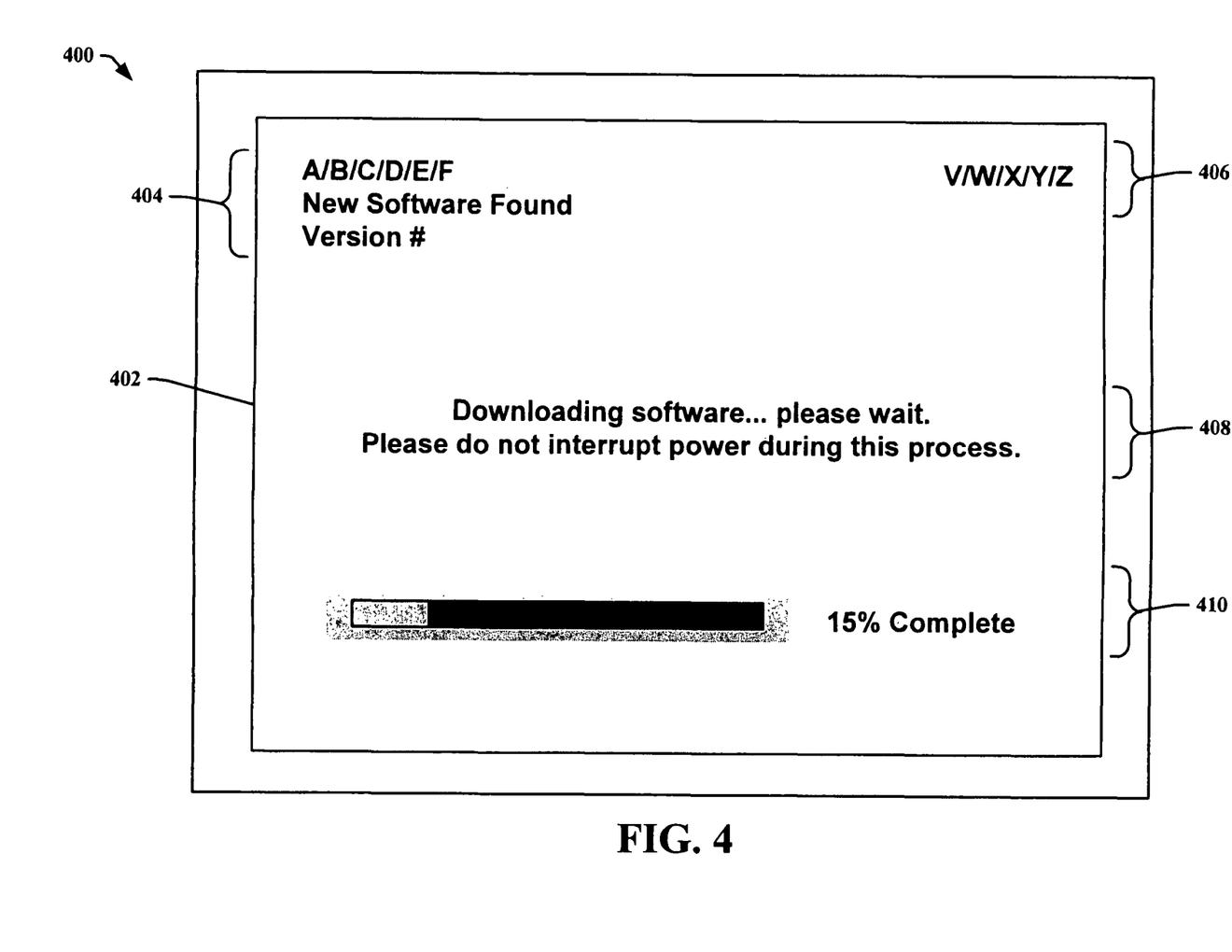
FIG. 4 is an example of a graphical user interface associated with a dynamic boot reporting system in accordance with an aspect of an embodiment.

The boot status information can be relayed to an end-user and/or technician via any means such as, for example, via a graphical user interface. Referring to FIG. 4, an example 400 of a graphical user interface (GUI) 402 associated with a dynamic boot reporting system in accordance with an aspect of an embodiment is shown. The example GUI is only one representation of possible GUIs that can be used with the techniques disclosed herein and is not meant to limit GUIs in any manner. The techniques disclosed herein can utilize a set of status and/or error codes pertinent to an IP content/service receiver designs, but can also be expanded to any mode of content/service receiver operation easily.

In one instance, a software component in the boot-code defines an event-based mechanism, wherein a driver's status from different components corresponding to different phases in the boot process can be substantially simultaneously propagated from the driver to an application layer inside the boot code. A simple thread in the application layer of the boot code can then handle events and/or route them to appropriate fields of, for example, an On Screen Display (OSD). One advantage of these techniques is that operators involved with equipment provisioning/customer support centers can easily troubleshoot boot issues associated with a content/service receiver. This reduces the call-volume and/or call-time (from the user of the content/service receiver, etc.), which saves money for the operator/support center, providing a better profit margin on the operations.

In one example, the text indicators 404, 406 at the top corners of the GUI 402 can have the following definitions. This example is not meant to limit the possible information that can be displayed on the GUI and is only meant as an example representation of a few types of data that can be provided by techniques disclosed herein. For example, the sequence of digits ('A/B/C/D/E/F') in the text indicator 404 on the top left hand side can represent data as indicated the tables below. TABLE 1 shows possible states of a DHCP algorithm (noted in the example 400 as "A" indicator). This information can be utilized to assist in troubleshooting connection problems in IP based content/service receivers and the like.

TABLE 1

"A" Indicator Definition of DHCP State

| Indicator | Meaning |
| --- | --- |
| 0 | None |
| 1 | Init |
| 2 | DHCP waiting for Offer |
| 3 | DHCP waiting for ACK |
| 4 | DHCP BOUND |
| 5 | Static IP in use |
| E6 | DHCP Failed |

TABLE 2 indicates which IP Address is in use or can display zeros if the address is not known (noted in example 400 as "B" indicator). This information is helpful in determining network addressing issues and the like, since the operator, for example, can connect to a particular receiver of their choice, using the IP address, and do more troubleshooting remotely, as desired.

TABLE 2

"B" Indicator IP Address in Use

| Indicator | Meaning |
| --- | --- |
| 12345678 | IP Address in use displayed in hex or 00000000 if unavailable |

TABLE 3 indicates the state of a session announcement protocol (SAP) algorithm (noted in example 400 as "C" indicator).

TABLE 3

"C" Indicator Definition of SAP Status

| Indicator | Meaning |
| --- | --- |
| 0 | None |
| 1 | Init |
| 2 | Waiting for Announcement |
| E3 | Invalid Announcement Received |
| E4 | SAP received, but no matching manufacturer/model ID |
| E5 | SAP received, but no size info |
| E6 | SAP received, but no MTFTP/TFTP server info |
| 7 | SAP Complete |

TABLE 4 indicates the state of the TFTP/MTFTP algorithm (noted in example 400 as "D" indicator).

TABLE 4

"D" Indicator Definition of MTFTP/TFTP Status for Unit

| Indicator | Meaning |
| --- | --- |
| 0 | None |
| 1 | tftp in progress |
| 02 | mtftp in progress |
| 03 | tftp complete |
| 04 | mtftp complete |
| B0 | mtftp recent block shown in "E" |
| B1 | Beginning to show percent complete |
| B2 | Beginning to show file version in "Z" |
| E0 | tftp file not found |
| E1 | tftp timeout |
| E2 | tftp file too big |
| E3 | mtftp file not found |
| E4 | mtftp timeout |
| E5 | mtftp file too big |

TABLE 5 indicates the most recent block number acquired for MTFTP/TFTP (noted in example 400 as "E" indicator).

TABLE 5

"E" Indicator TFTP/MTFTP Blocks

| Indicator | Meaning |
| --- | --- |
| 0 | None |
| 1 ... N | Recent block (mtftp/tftp) |

TABLE 6 is the unit status (noted in example 400 as "F" indicator).

TABLE 6

"F" Indicator Definition on Unit Screens

| Indicator | Meaning |
| --- | --- |
| 10 | Unit Init |
| 20 | Unit is downloading file |
| 30 | Download Image Validation |
| 90 | Download Finished |
| A0 | Abort |
| A1 | Awaiting user input |
| E0 | Invalid Image |
| E1 | USB enumeration failure |

The sequence of digits ('V/W/X/Y/Z') of the text indicator 406 on the top right hand corner can be defined as follows.

| | |
| --- | --- |
| V | Manufacturer ID |
| W | Model ID |
| X | Unit version |
| Y | Unit software version |
| Z | Software version to be downloaded |

The order and/or arrangement of the indicators are not generally significant except for ease of interpretation, and the indicators can appear in any order anywhere on the GUI 402. The GUI 402 also is not required to have all of the indicators noted above. The GUI 402 can have additional information such as, for example, download status and/or warnings/messages 408 and/or a completion status graphical indicator 410 and the like. The text indicators 404 and 406 can also be represented utilizing graphical means as well. The GUI 402 itself can be located, for example, on a content/service receiver (e.g., on a display built into the content/service receiver), on a display device attached to the content service/receiver, and/or on a remote display device connected to a network associated with the content service/receiver (e.g., displayed remotely so a remote technician can view the GUI directly) and the like.

Figure 5:
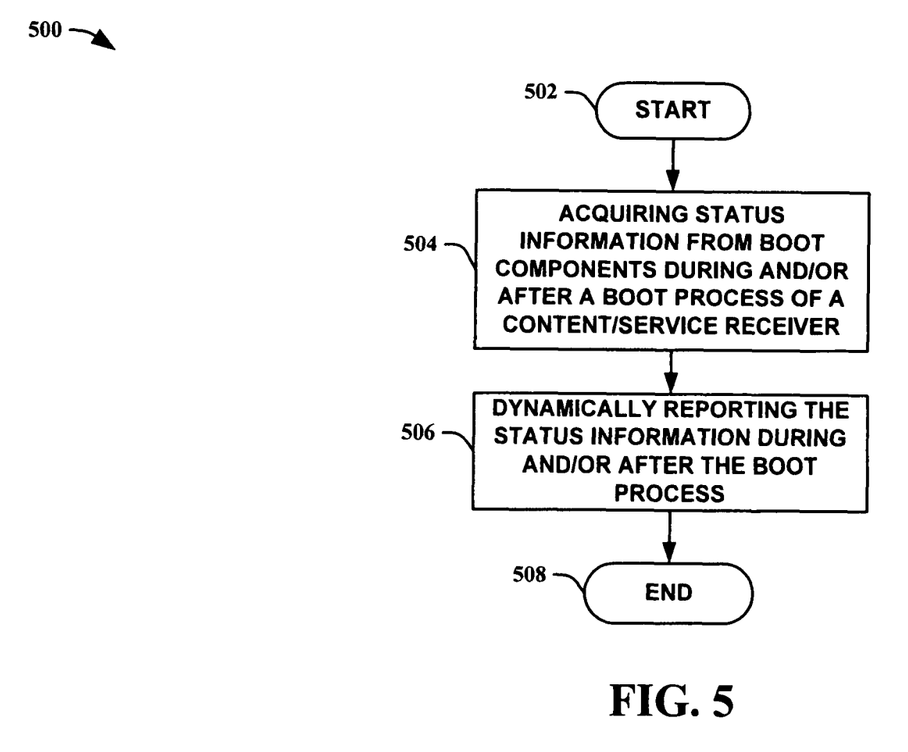
FIG. 5 is a flow diagram of a method of dynamically reporting boot status information in accordance with an aspect of an embodiment.
Figure 6:
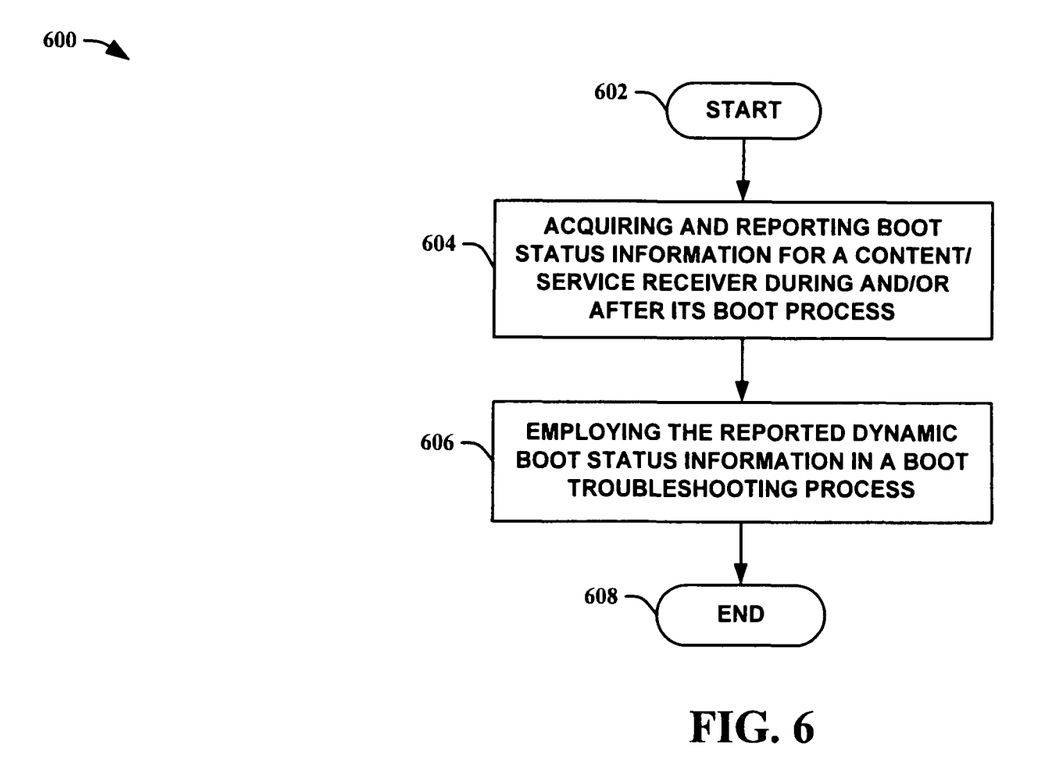
FIG. 6 is a flow diagram of a method of utilizing dynamic boot status information to troubleshoot a boot process in accordance with an aspect of an embodiment.
Figure 7:
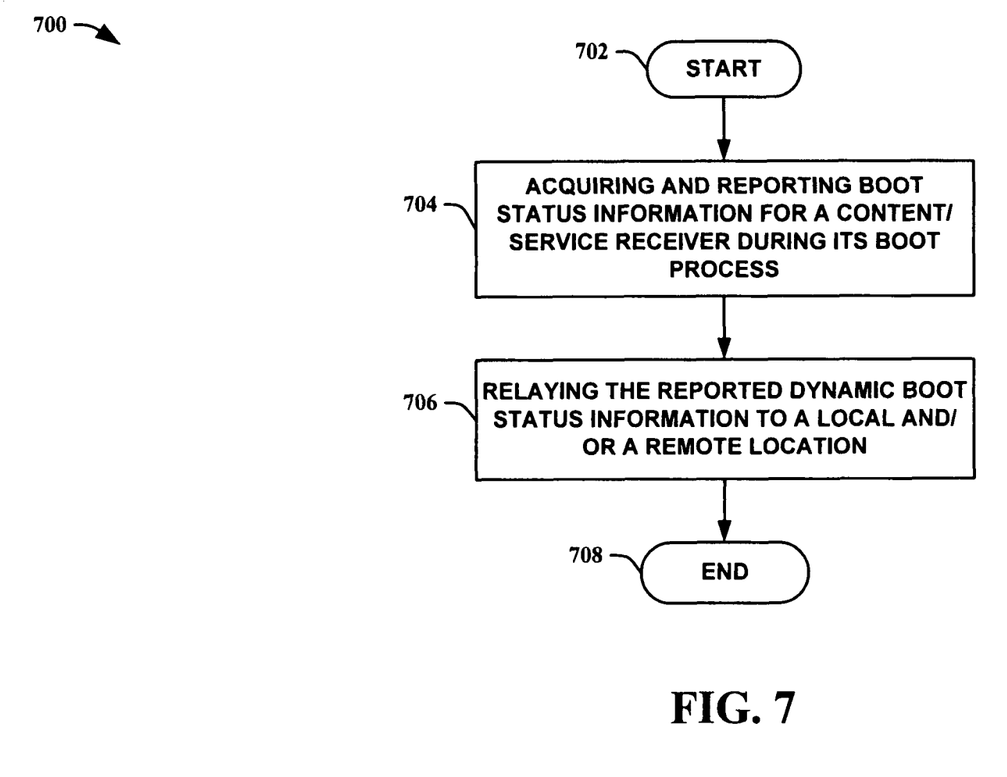
FIG. 7 is a flow diagram of a method of relaying the dynamic boot status information to various interfaces in accordance with an aspect of an embodiment.

In view of the exemplary systems shown and described above, methodologies that can be implemented in accordance with the embodiments will be better appreciated with reference to the flow charts of FIGS. 5-7. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

In FIG. 5, a flow diagram of a method 500 of dynamically reporting boot status information in accordance with an aspect of an embodiment is shown. The method 500 starts 502 by acquiring status information from boot components during and/or after a boot process of a content/service receiver 504. The boot component status information can be acquired from various components of a content/service receiver that relay status information during a boot process and can include, but is not limited to, information from software drivers, memory, and/or data and the like. Optional acquisition preferences can be used to augment the acquisition process. The optional acquisition preferences can include preferences as to which boot components to receive information from and/or interface/protocol information necessary to interface with various boot components. Thus, the optional acquisition preferences can allow the acquisition process to be updated/changed as necessary to make it compatible with different firmware and/or models, etc. of content/service receivers. The optional acquisition preferences can be obtained for the acquisition process via a local interface (e.g., from a connected display device and/or input device) and/or via a remote interface (e.g., over a network) and the like.

The status information is then dynamically reported during and/or after the boot process 506, ending the flow 508. Optional reporting preferences can be used to augment the reporting process. The optional reporting preferences can include preferences, for example, as to what boot status information is to be reported. This can allow the reporting process to be updated/changed as necessary to make it compatible with boot processes, end-users and/or content/service receiver models, etc. The optional reporting preferences can be obtained via a local interface (e.g., from a connected display device and/or input device) and/or via a remote interface (e.g., over a network) and the like. Interfaces such as, for example, GUIs and the like can be provided to allow user interactions with the reported information. For example, end-users and/or remote technicians and the like can interact with the displayed information to allow more details and/or definitions of error codes and the like to be displayed.

Looking at FIG. 6, a flow diagram of a method 600 of utilizing dynamic boot status information to troubleshoot a boot process in accordance with an aspect of an embodiment is depicted. The method 600 starts 602 by acquiring and reporting boot status information for a content/service receiver during and/or after its boot process 604. The boot status information can be acquired from various components of a content/service receiver that relay status information during a boot process and can include, but is not limited to, information from software drivers, memory, and/or data and the like. The reported dynamic boot status information is then employed in a boot troubleshooting process 606, ending the flow 608. The reported dynamic boot status information can be employed in the troubleshooting process directly and/or indirectly. For example, the boot status information can feed directly into a troubleshooting process such as, for example, an automated troubleshooting process that can utilize the boot status information to analyze problems. The boot status information can also be used indirectly and/or relayed via a third party for use in a troubleshooting process as well. The above method 600 includes both machine automated, human interaction, and/or hybrid (e.g., machine/man interaction) troubleshooting processes.

Turning to FIG. 7, a flow diagram of a method 700 of relaying the dynamic boot status information to various interfaces in accordance with an aspect of an embodiment is illustrated. The method 700 starts 702 by acquiring and reporting boot status information for a content/service receiver during its boot process 704. The boot status information can be acquired from various components of a content/service receiver that relay status information during a boot process and can include, but is not limited to, information from software drivers, memory, and/or data and the like. The reported dynamic boot status information is then relayed to a local and/or a remote location 706, ending the flow 708. Local locations can include, but are not limited to, devices connected to a content/service receiver and/or devices integrated into a content/service receiver. Remote locations can include, but are not limited to, devices connected via a network, including wired and/or wireless networks and the like. The networks can include, but are not limited to, the Internet, an intranet network, digital subscriber line (DSL) networks, satellite networks, cellular networks and the like. The communication protocols for relaying the information can vary widely, but are not limited to, any available standard and/or proprietary protocols and the like. Devices can include, but are not limited to, visual, aural, and/or other sensory devices and the like (e.g., speakers, displays, touch feedback systems—Braille, etc.).

In other instances, a data packet, transmitted between two or more devices, that facilitates content delivery is comprised of, at least in part, information relating to dynamically reporting boot process information for a receiver of a content delivery system.

It is to be appreciated that the systems and/or methods of the embodiments can be utilized in content/service delivery facilitating computer components and non-computer related components alike. Further, those skilled in the art will recognize that the systems and/or methods of the embodiments are employable in a vast array of electronic related technologies, including, but not limited to, computers, settop boxes, mobile communication devices, and/or handheld electronic devices, and the like.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
    an acquisition component that operates within a boot process and acquires status information in connection with the boot process from a plurality of distinct boot components in accordance with acquisition preferences set by an end-user that define which boot components to acquire status information from; and
    a reporting component that operates within the boot process and uses a processor to dynamically relay the status information acquired from the plurality of distinct boot components in connection with the boot process as a sequence of digits on a graphical user interface, each of said digits corresponding to the status information of a respective boot component.

2. The system of claim 1, wherein the reporting component obtains reporting preferences from an end-user.

3. The system of claim 2, wherein the reporting preferences define which acquired status information the reporting component will relay.

4. The system of claim 1, wherein the graphical user interface includes at least one of an on-screen display (OSD) and a content/service receiver display.

5. The system of claim 1, wherein the reporting component relays the information to a remote location.

6. The system of claim 5, wherein the reporting component relays the information to a location via any available communication media/channels utilizing any protocols, as desired.

7. The system of claim 5, wherein the remote location is a device connected via a network.

8. The system of claim 1 wherein the reporting component relays an error code definition.

9. The system of claim 8, wherein the reporting component relays at least one of the boot status, error code definition and error code, from various boot-stages, in one single snapshot that can be utilized by at least one of an end-user and other medium.

10. The system of claim 8, wherein the reporting component relays at least one of the boot status, error code definition and error codes, from various boot-stages, in a step-by-step snapshot that can be utilized by at least one of an end-user and other medium.

11. A computer readable medium having stored thereon computer executable components of the system of claim 1.

12. A device employing the system of claim 1 comprising at least one selected from the group consisting of a computer, a set top box, mobile communication devices and a handheld electronic device.

13. The system of claim 1, wherein the system is a set-top box.

14. A method, comprising the steps of:
    acquiring status information from a plurality of distinct boot components that operates within a boot process of a content/service receiver in accordance with acquisition preferences set by an end-user that define which boot components to acquire status information from; and
    dynamically reporting the status information acquired from the plurality of distinct boot components in connection with the boot process from a reporting component that operates within the boot process using a processor as a sequence of digits on a graphical user interface, each of said digits corresponding to the status information of a respective boot component.

15. The method of claim 14 further comprising:
employing a boot component comprising at least one of a plurality of several other boot components and boot stages, as desired.

16. The method of claim 14 further comprising:
acquiring status information from at least one of a software driver and any other component of at least one of software, hardware and middleware in association with the boot process.

17. The method of claim 14 further comprising:
reporting status information for use in a boot troubleshooting process.

18. The method of claim 14 further comprising:
relaying the reported status information to an end-user.

19. The method of claim 14 further comprising:
relaying the reported status information to a remote location.

20. The method of claim 14 further comprising:
relaying the reported status information to a location, using at least one of wired, wireless and any other communication medium available.

21. The method of claim 14 further comprising:
relaying the reported status information to a location, using any communication protocols available.

22. The method of claim 14 further comprising:
employing a graphical user interface to display the reported status information.

23. The method of claim 14 further comprising:
retrieving definitions of status information in response to user interactions.

24. A device employing the method of claim 14 comprising at least one selected from the group consisting of a computer, a set top box, mobile communication devices, and a handheld electronic device.

25. A system, comprising:
means for acquiring boot status information from a plurality of distinct boot components that operates within a boot process in accordance with acquisition preferences from an end-user that define which boot components to acquire status information from; and
means for dynamically relaying the boot status information acquired from the plurality of distinct boot components in association with the boot process that uses a processor in performing such dynamic relaying and operates within the boot process as a sequence of graphical digits, each of said digits corresponding to the status information of a respective boot component.

* * * * *